United States Patent
Geisler (10) Patent No.: US 10,916,124 B2
(45) Date of Patent: Feb. 9, 2021

(54) METHOD, DEVICE AND SYSTEM FOR WRONG-WAY DRIVER DETECTION

(71) Applicant: Robert Bosch GmbH, Stuttgart (DE)

(72) Inventor: Simon Geisler, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 16/301,094

(22) PCT Filed: Apr. 13, 2017

(86) PCT No.: PCT/EP2017/058957
§ 371 (c)(1),
(2) Date: Nov. 13, 2018

(87) PCT Pub. No.: WO2017/211488
PCT Pub. Date: Dec. 14, 2017

(65) Prior Publication Data
US 2019/0189003 A1 Jun. 20, 2019

(30) Foreign Application Priority Data

Jun. 7, 2016 (DE) .......................... 10 2016 210 025

(51) Int. Cl.
*G01C 21/30* (2006.01)
*G01C 21/36* (2006.01)
(Continued)

(52) U.S. Cl.
CPC ........... *G08G 1/0112* (2013.01); *G01C 21/30* (2013.01); *G01C 21/3697* (2013.01);
(Continued)

(58) Field of Classification Search
CPC .. G01C 21/3697; G01C 21/30; G08G 1/0112; G08G 1/0133; G08G 1/0145; G08G 1/056; G08G 1/164
(Continued)

(56) References Cited

U.S. PATENT DOCUMENTS

2012/0290150 A1   11/2012  Doughty et al.
2013/0304374 A1*  11/2013  Lee .................... G06K 9/00798
                                                     701/445
(Continued)

FOREIGN PATENT DOCUMENTS

DE    102011120497 A1   6/2012
DE    102012208974 A1   12/2012

OTHER PUBLICATIONS

Tao Junli et al: "Wrong Roadway Detection for Multi-lane Roads", Aug. 27 https://www.researchgate.net/publication/257579974_Wrong_Roadway_Detection_for_Multi-Lane_Roads (Year: 2013).*

(Continued)

*Primary Examiner* — Behrang Badii
*Assistant Examiner* — Hossam M Abd El Latif
(74) *Attorney, Agent, or Firm* — Norton Rose Fulbright US LLP; Gerard Messina (57) ABSTRACT

A method for wrong-way driver detection, including a step of reading map data mapping road segments of a road network negotiable by a vehicle, a step of determining a plurality of instantaneous particles using a measured instantaneous position of the vehicle, one particle representing an assumed position of the vehicle and a weighting assigned to the assumed position, a step of reading in a plurality of previously filtered particles representing particles filtered in a preceding step of filtering using a particle filter, a step of determining a set of plausible road segments, using the plurality of instantaneous particles and the plurality of previously filtered particles, and a step of filtering the plurality of instantaneous particles based on the set of plausible road segments, using the particle filter, to determine a plurality of filtered particles.

8 Claims, 8 Drawing Sheets

(51) Int. Cl.
*G08G 1/01* (2006.01)
*G08G 1/056* (2006.01)
*G08G 1/16* (2006.01)

(52) U.S. Cl.
CPC ......... *G08G 1/0133* (2013.01); *G08G 1/0145* (2013.01); *G08G 1/056* (2013.01); *G08G 1/164* (2013.01)

(58) Field of Classification Search
USPC ........................................................ 701/117
See application file for complete search history.

(56) References Cited

U.S. PATENT DOCUMENTS

| | | | | |
|---|---|---|---|---|
| 2013/0338850 A1* | 12/2013 | Takahara | ............... | G01C 21/26 701/1 |
| 2014/0350837 A1* | 11/2014 | Galbas | ................... | G08G 1/056 701/301 |
| 2016/0187149 A1* | 6/2016 | Goto | .................... | G08G 1/0129 701/522 |

OTHER PUBLICATIONS

International Search Report for PCT/EP2017/058957, dated August 10, 2017.

Tao Junli et al., "Wrong Roadway Detection for Multi-lane Roads", Aug. 27, 2013, Network and Parallel Computing: Lecture Notes in Computer Science; Springer International Publishing, pp. 50-58, XP047038828.

F. Peyet et al., "Lane-level positioning for cooperative systems using EGNOS and enhanced digital maps", Mar. 31, 2008, XP055393844.

Schindler Andreas, "Vehicle self-localization with high-precision digital maps", 2013 IEEE Intelligent Vehicles Symposium ( I V ), I EEE , Jun. 23, 2013, pp. 141-146, XP032502004.

* cited by examiner

METHOD, DEVICE AND SYSTEM FOR WRONG-WAY DRIVER DETECTION

BACKGROUND INFORMATION

The present invention is directed to a device and to a method for wrong-way driver detection. The present invention also relates to a computer program.

Wrong-way drivers ("ghost drivers") cause at least considerable property damage in the event of an accident. The detection based only on the navigation device (road class and direction) is too late in most instances, i.e., the wrong-way driver is already traveling (at a high driving speed and with a high probability of a collision) on the wrong lane.

SUMMARY

The present invention provides a method, furthermore a device and a system for wrong-way driver detection, and finally a corresponding computer program. The measures described herein allow advantageous refinements of and improvements on the device in accordance with the present invention.

A, for example, cloud-based wrong-way driver warning may advantageously be implemented with a detection which is adapted specifically to the case, using a particle filter.

A method for wrong-way driver detection includes the following steps:

reading in map data mapping road segments of a road network negotiable by the vehicle;

determining a plurality of instantaneous particles using a measured instantaneous position of the vehicle, one particle representing an assumed position of the vehicle and a weighting assigned to the assumed position;

reading in a plurality of previously filtered particles representing particles filtered in a preceding step of filtering using a particle filter;

determining a set of plausible road segments, using the plurality of instantaneous particles and the plurality of previously filtered particles; and filtering the plurality of instantaneous particles based on the set of plausible road segments, using the particle filter, to determine a plurality of filtered particles.

The vehicle may be a road vehicle. Wrong-way driving may be understood to mean a drive of the vehicle on a road counter to a prescribed driving direction. The measured position may have been measured using a sensor situated in the vehicle. The plurality of particles may be determined using a method using known particle filters. The particles may have different assumed positions which, for example, are grouped around the measured position. The map data may be read out from a digital map, for example. A plausible road segment may be understood to mean a road segment for which it is assumed, after evaluation of the present data, that the vehicle is situated thereon.

In the step of filtering the plurality of instantaneous particles, new weightings may be determined for the plurality of instantaneous particles. In this way, particles which appear to be plausible may be weighted higher to improve the result of the method.

The method may include a step of providing a wrong-way driving signal, using the plurality of filtered particles. The wrong-way driving signal may indicate whether or not the vehicle is driving the wrong way. For example, the wrong-way driving signal may only be provided when a wrong-way drive is assumed.

In the step of determining a set of plausible road segments, a set of preceding plausible road segments may be read in, which represent a set of plausible road segments determined in a preceding step of determining. Furthermore, a set of uncertain road segments may be determined, using the plurality of instantaneous particles. Finally, the set of preceding plausible road segments may be supplemented with those of the uncertain road segments which have a connection to one of the preceding plausible road segments to form the set of plausible road segments. In this way, the set of plausible road segments may be continuously updated.

The method may include a step of determining a traveled distance of the vehicle, using the set of plausible road segments. In the step of filtering, the plurality of instantaneous particles may be filtered based on the traveled distance. By considering the traveled distance, the weighting of the particles may be adapted, for example.

The method may include a step of reading in the measured instantaneous position via an interface of a so-called processor cloud. This enables a cloud-based solution.

A corresponding device for wrong-way driver detection is configured to carry out steps of the described method in corresponding units. For example, such a device may include a read-in unit, which is designed to read in map data mapping the road segments of a road network negotiable by the vehicle, a determination unit, which is designed to determine a plurality of instantaneous particles using a measured instantaneous position of the vehicle, one particle representing an assumed position of the vehicle and a weighting assigned to the assumed position, a read-in unit, which is designed to read in a plurality of previously filtered particles representing particles filtered in a preceding step of filtering using a particle filter, a determination unit, which is designed to determine a set of plausible road segments, using the plurality of instantaneous particles and the plurality of previously filtered particles, and a filter unit, which is designed to filter the plurality of instantaneous particles based on the set of plausible road segments, using the particle filter, to determine a plurality of filtered particles. Accordingly, the device may include the particle filter.

A corresponding system for wrong-way driver detection includes at least one transmitter, which is situatable or situated in a vehicle and designed to emit position data, and a described device for wrong-way driver detection, which is designed to receive the position data emitted by the at least one transmitter, for example via a wireless connection.

A further system for wrong-way driver detection includes at least one transmitter, which is situatable or situated in a vehicle and designed to emit position data, the position data representing a measured position of a vehicle, and at least one receiver unit, which is situatable or situated in a vehicle and designed to receive data of a device, which according to the approach described here for wrong-way driver detection is designed to receive the position data emitted by the at least one transmitter.

The described method may be implemented in software or hardware or in a mixed form made up of software and hardware, for example in a device.

For this purpose, the device may include at least one processing unit for processing signals or data, at least one memory unit for storing signals or data and/or at least one communication interface for reading in or outputting data, which are embedded into a communication protocol. The processing unit may be a signal processor, a microcontroller or the like, for example, it being possible for the memory unit to be a Flash memory, an EPROM or a magnetic memory unit. The communication interface may be designed to read in or output data wirelessly and/or in a wire-bound manner, a communication interface which is able to read in or output wire-bound data being able to read these data in, for example electrically or optically, from a corresponding data transmission line or output these into a corresponding data transmission line.

A device in the present invention may be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the approach described here are shown in the figures and are described in greater detail below.

DETAILED DESCRIPTION OF EXAMPLE EMBODIMENTS

In the following description of favorable exemplary embodiments of the present invention, identical or similar reference numerals are used for similarly acting elements shown in the different figures, and a repeated description of these elements is dispensed with.

Figure 1:
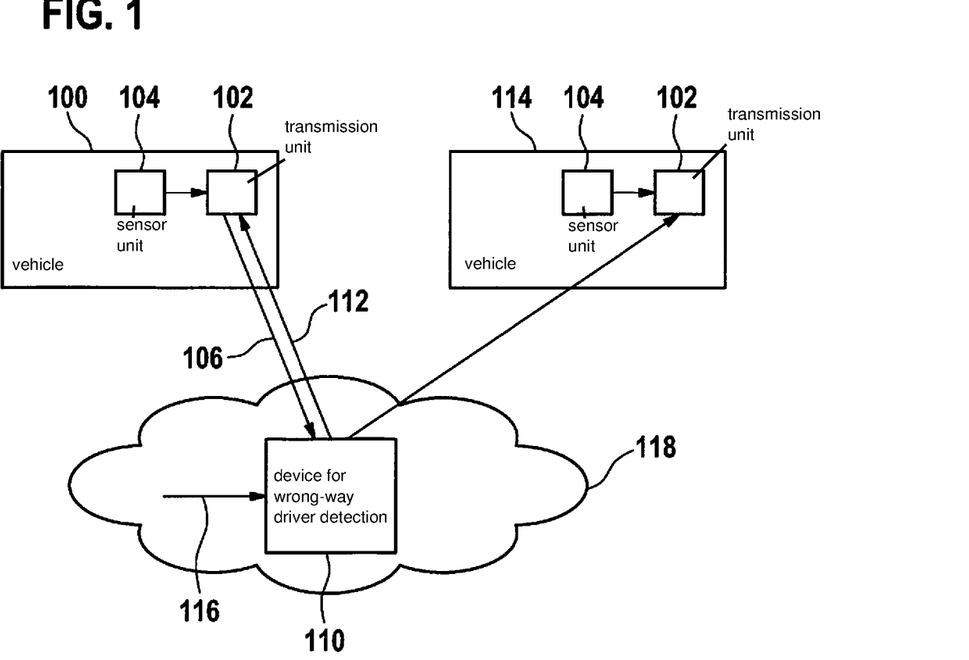
FIG. 1 shows a system for wrong-way driver detection according to one exemplary embodiment.

FIG. 1 shows a system for wrong-way driver detection according to one exemplary embodiment. The system includes a vehicle 100, which includes a transmission unit 102 designed to wirelessly emit measuring data 106, collected using at least one sensor unit 104 situated in vehicle 100, to a device 110 for wrong-way driver detection. Device 110 is designed to edit measuring data 106 into edited data and to further process the edited data, using a particle filter, to generate and emit a wrong-way driving signal 112. According to one exemplary embodiment, wrong-way driving signal 112 indicates that vehicle 100 whose measuring data 106 were processed is presently driving the wrong way. According to this exemplary embodiment, both transmission unit 102 of vehicle 100 and a transmission unit 102 of a further vehicle 114 are designed to receive wrong-way driving signal 112 and, in response to a reception of wrong-way driving signal 112, to activate a warning unit of the respective vehicle 100, 114 which, for example, warns a driver of the respective vehicle 100, 114 about the wrong-way drive or, according to one exemplary embodiment, intervenes in an at least semi-automatic control, for example of a braking system or steering system, of the respective vehicle 100, 114. According to different exemplary embodiments, transmission unit 102 may only be designed as a transmitter or as a transceiver unit.

According to one exemplary embodiment, measuring data 106 include position data which were detected using a position determination unit of vehicle 100 and map an instantaneous position of vehicle 100. According to one further exemplary embodiment, measuring data 106 furthermore include movement data, which were detected, for example, using at least one acceleration sensor of vehicle 100 and include pieces of information concerning an instantaneous movement of vehicle 100, for example pieces of information concerning a driving direction, a longitudinal acceleration, a transverse acceleration, or concerning a rotation of the vehicle about a vehicle axis.

According to one exemplary embodiment, device 110 is designed to read in map data 116 which map a road network negotiable by vehicle 100. According to one exemplary embodiment, map data 116 include, for example, pieces of information about road segments of the road network. According to one exemplary embodiment, map data 116, with respect to each road segment, furthermore include at least one parameter which, for example, defines a driving direction specification for the respective road segment or a course of the respective road segment. For example, it may be defined via the parameter whether the road segment extends linearly or follows a curve. According to one specific embodiment, device 110 includes a memory unit in which map data 116 are stored.

According to one exemplary embodiment, device 110 is, or functional blocks of device 110 are, situated or implemented in a cloud 118.

The described approach may be used additionally or alternatively to a variety of methods for detecting a wrong-way driver in which, e.g., a video sensor system is used to detect the passing of a "do not enter" sign or the use of a digital map in conjunction with a navigation is utilized to identify a detection of a wrong driving direction on a road segment which is only negotiable in one direction. Furthermore, the approach may be combined with wireless methods, which detect wrong-way drivers with the aid of infrastructure, such as markers in the roadway or on the roadside.

In addition to detecting a wrong-way driver, the described approach offers many options for responding to a wrong-way driver. Examples include the warning of the wrong-way driver directly via a display or acoustic instructions. It is also possible to use methods by which other drivers in the vicinity of a wrong-way driver are warned, e.g., via vehicle-to-vehicle communication or with the aid of mobile communication. Furthermore, it is possible to warn other road users via variable message signs mounted along the roadside. It is also possible for an intervention in the engine control unit or brake of the vehicle 100 driving the wrong way to take place.

The described approach makes it possible to detect a wrong-way driver and to warn other road users in his or her vicinity in a timely manner, for which only very little time is available.

The described approach applies to a wrong-way driver detection with a client-server solution. A client shall be understood to mean a device, situated on or in a motor vehicle, which has an Internet connection and at least access to position coordinates. For example, it may be transmission unit 102. Transmission unit 102 may be a smart phone, for example. Sensor unit 104 may be integrated into transmission unit 102. In this way, wrong-way driver-specific server-client communication may be implemented with a smart phone as an exemplary client. The smart phone may be connected via a mobile communication network with the aid of a gateway (PDN_GW) to the Internet, in which device 110 may be situated, for example in the form of a server.

From the possible functionalities of a wrong-way driver warning using a client-server solution, the following key problem areas arise for this technology, which are addressed by the approach described here:

a) False Positive Reduction

False positives, i.e., misdetections in the case of correct driving, must be reduced as much as possible, or completely avoided, in the case of a driver warning and/or an active intervention. Depending on the warning concept, the standards up to ASIL A must be met.

b) Time-Critical Execution of the Trigger Chain

To keep the risk for other road users originating from a wrong-way driver as low as possible, an intervention and/or warning should take place as quickly as possible. This means, the entire functional chain from the detection of a critical situation, through the detection of a wrong-way driver, to the intervention or warning should be run through in a preferably short time period. The utilization and thus the necessary performance capability of the server, for example of device 110, during a comprehensive use of this function plays a very important role. In addition to the trigger time, the economic efficiency also represents an important sub-aspect.

c) Communication, Data Efficiency and Power Consumption

The communication and the power consumption must be as efficient and as low as possible, especially for mobile devices, to achieve an acceptable rechargeable battery operating time. The overloading of a mobile communication cell or other wireless communication unit also has to be suppressed by a data-efficient communication. In addition, the data volume and the associated costs have to be limited to the extent possible. The efficiency of the communication is also an extremely important factor on the server side for reasons of processing performance.

The described approach covers especially the key areas a) "false positive reduction" and b) "time-critical execution of the trigger chain", but c) "communication, data efficiency and power consumption" is also possibly influenced. The detection of wrong-way drivers in cloud 118, based on commercially available smart phone and connectivity control unit sensor systems, is no trivial undertaking.

Figure 2:
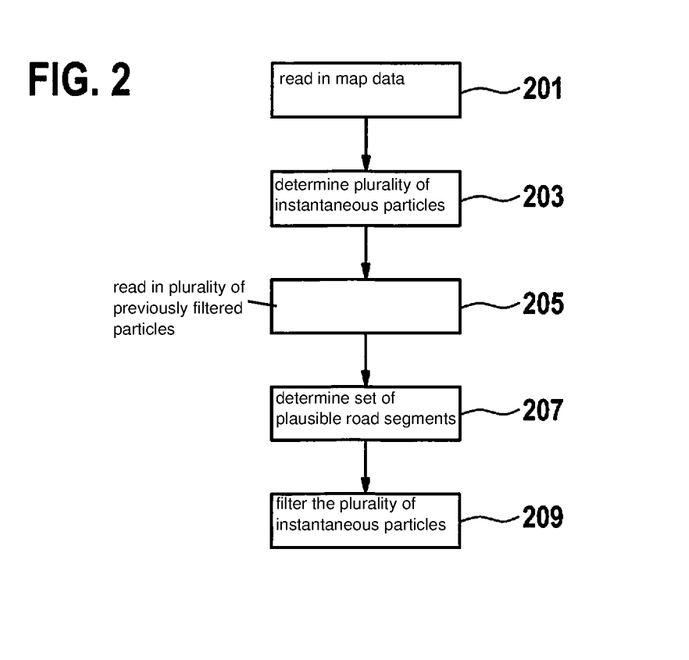
FIG. 2 shows a flow chart of a method for wrong-way driver detection according to one exemplary embodiment.

FIG. 2 shows a flow chart of a method for wrong-way driver detection according to one exemplary embodiment. For example, the method may be carried out using units of the device shown in FIG. 1 for wrong-way driver detection.

The method includes a step 201 in which map data mapping road segments of a road network negotiable by the vehicle are read in. In a step 203, a plurality of instantaneous particles is determined, using a measured instantaneous position of the vehicle. One particle represents an assumed position of the vehicle and a weighting assigned to the assumed position. In a step 205, a plurality of previously filtered particles is read in. In a step 207, a set of plausible road segments is determined, using the plurality of instantaneous particles and the plurality of previously filtered particles. In a step 209, the plurality of instantaneous particles is filtered based on the set of plausible road segments, using the particle filter. A plurality of filtered particles is determined which, in a chronologically subsequent step 205, may be read in as a plurality of previously filtered particles.

It is not crucial for the wrong-way driver detection to know which route the wrong-way driver traveled. The information which is required is mainly where the wrong-way driver is presently situated, and whether he or she is traveling a road counter to the driving direction. For this ascertainment, the history is required, of course, which, however, is not part of the problem, but rather the path to the result.

Based on these circumstances, a method based on a particle filter is introduced. Similarly to the Kalman filter, the particle filter may be used for systems which are subject to a hidden Markov chain characteristic, i.e., a Markov chain with unobserved states.

Figure 3:
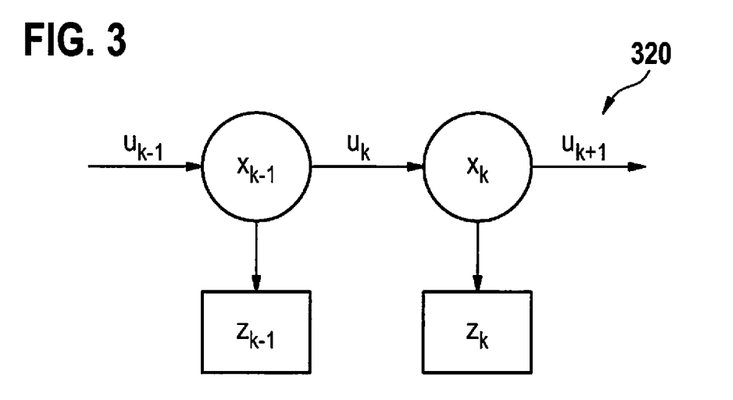
FIG. 3 shows a hidden Markov chain model.

FIG. 3 shows a hidden Markov chain model 320 including state x and observation z at times k and k-1.

This means, the state of a system cannot be measured directly, but may be estimated based on other observations. In this case, the position and thus the instantaneous road must be estimated. For this purpose, the following equation must be solved:

$$p(x_k|z_{0:k}) = \eta \cdot g(z_k|, z_{0:k-}, u_{0:k}) \pi(x_k|z_{0:k-1}, u_{0:k})$$

The state at point in time k is described hereafter with $x_k$, and the previous states are summarized with $x_{0:k-1} = (x_0, \ldots, x_{k-1})$. Analogously to x, this convention also applies to control variables u and observations u. $\eta$ describes a normalization term, which hereafter, however, is not of great importance. This equation may be simplified to the following equation:

$$p(x_k|z_{0:k}, u_{0:k}) = \eta \cdot g(z_k|x_k) \int_{x_{k-1}} f(x_k|x_{k-1}, u_k) p(x_{k-1}|z_{0:k}, u_{0:k}) dx_{k-1}.$$

And this is described in two steps: the prediction step $$\pi(x_k|z_{0:k-1}, u_{0:k}) = \int_{x_{k-1}} \underbrace{f(x_k|x_{k-1}, u_k)}_{motion} p(x_{k-1}|z_{0:k-1}, u_{0:k}) dx_{k-1}$$

and the weighting term:

$$p(x_k|z_{0:k}, u_{0:k}) = \eta \cdot \underbrace{g(z_k|x_k, u_k)}_{observations} \pi(x_k|z_{0:k-1}, u_{0:k}),$$

In the case of a particle filter, the integral is solved via the probability distributions using a numerical approximation $$\pi(x) = \sum_{j=1}^{J} w^{[j]} \delta(x - x^{[j]})$$

and Monte Carlo methods. $w^{[j]}$ describes the weight/the probability of each jth particle. A set of particles is described with $$x = \{\langle x^{[j]}, w^{[j]} \rangle\}_{j=1,\ldots,]}$$

In this way, each particle has the weight $w^{[j]}$ and the state $x^{[j]}$.

Figure 4:
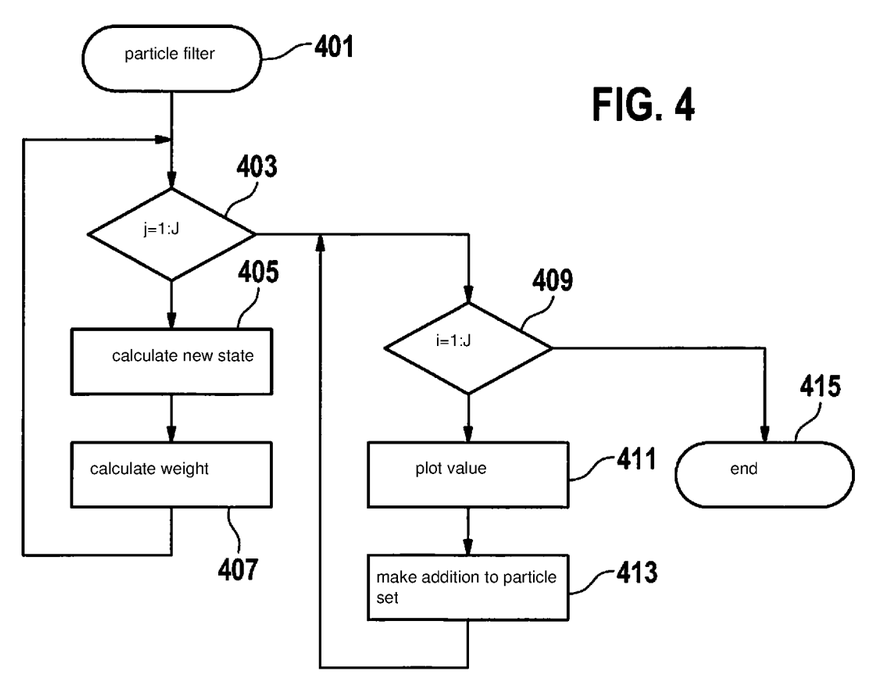
FIG. 4 shows a sequence of a particle filter process according to one exemplary embodiment.

FIG. 4 shows the sequence of a particle filter process according to one exemplary embodiment. For this purpose, FIG. 4 shows a hidden Markov chain model having state x and observation z at times k and k-1.

A large portion of the work is to find a suitable function for $$\underbrace{f(x_k | x_{k-1}, u_k)}_{motion}$$

and $$\underbrace{g(z_k | x_k, u_k)}_{observations}$$

which optimally display the problem. For this, it is essential to define states x to be estimated.

Block 401 denotes the particle filter ($x_{k-1}$, $u_k$, z).

From block 403, jumps are made to block 405 until all values j=1:J have been run through.

In block 405, a new state is calculated:

$$x_k^{[j]} = f(x_k | x_{k-1}^{[j]}, u_k)$$

In block 407, the weight is calculated:

$$w_k^{[j]} = g(z_k, m_j | x_k, u_k).$$

When all values have been run through in block 403, a jump to block 409 occurs. From block 409, jumps are made to block 411 until all values i=1:J have been run through.

In block 411, a value according to $w_k^{[i]}$ is plotted.

In block 413, an addition is made to the particle set according to $x_k^{[i]} \to X_k$.

When all values have been run through in block 409, a jump to block 415 occurs, which represents the end $X_k$.

Figure 5:
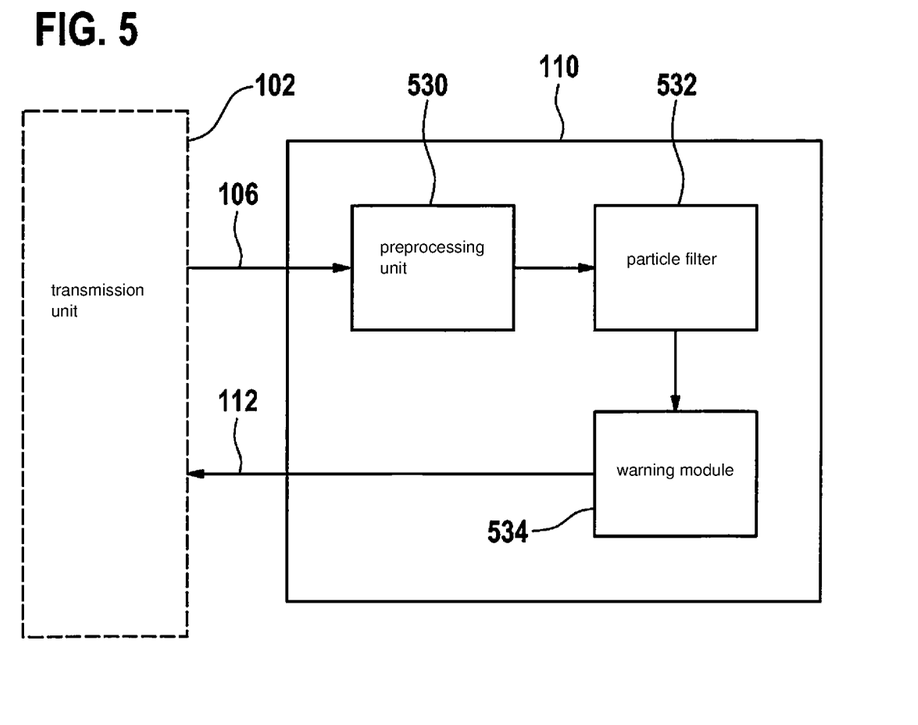
FIG. 5 shows a system for wrong-way driver detection according to one exemplary embodiment.

FIG. 5 shows a system for wrong-way driver detection according to one exemplary embodiment. The system includes units 102, for example in the form of the transmission units described based on FIG. 1, and a device 110 for wrong-way driver detection, which according to this exemplary embodiment is designed as a so-called WDW server. Device 110 is designed to receive data 106, for example measuring data described based on FIG. 1, from unit 102, and to provide a warning 112 based on data 106 and send them back to units 102, for example in the form of the wrong-way driving signal described based on FIG. 1.

The device includes a unit 530 for preprocessing, a particle filter 532 and a warning module 534.

Particle filter 532 is embedded in a simplified architecture of a cloud-based wrong-way driver warning as shown in FIG. 5.

Using particle filter 532, it is possible to approximately determine the probability distribution of the position of the car.

Figure 6:
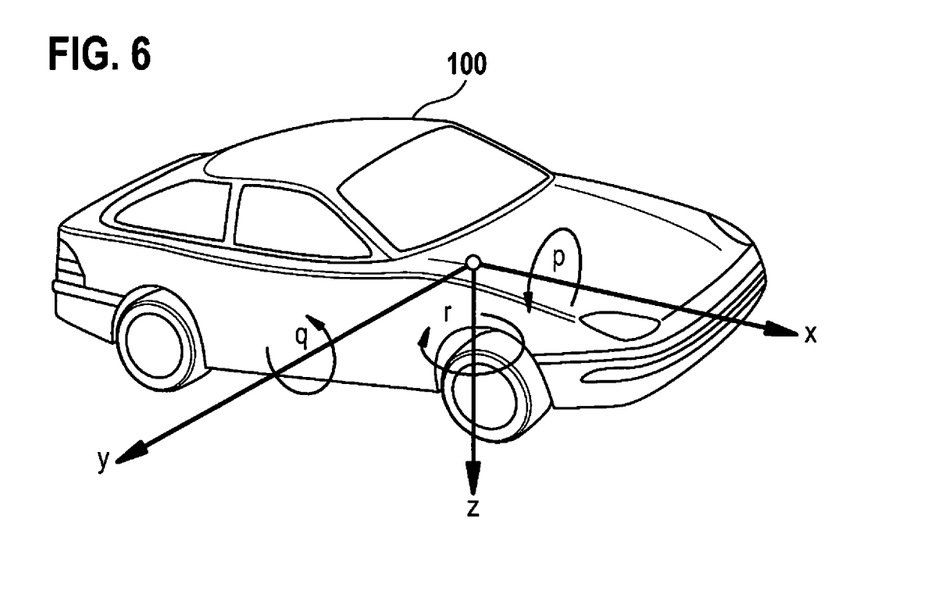
FIG. 6 shows a vehicle according to one exemplary embodiment.

Based on a vehicle 100, FIG. 6 shows values which may be incorporated into the model shown based on FIG. 5. The values may, for example, be states in the direction of longitudinal axis x, transverse axis y, vertical axis z and a rolling p about the longitudinal axis, a pitching q about the transverse axis, and a yawing r about the vertical axis.

With respect to a map matching using the particle filter, for the Bayes filter $p(x_k | z_{0:k}, u_{0:k})$ applies. With reference to FIG. 3, $x_k$ may denote what the state (not measured) is, for example the geographical longitude, latitude and altitude, $u_{k+1}$ may denote how vehicle 100 is moving, for example with respect to the speed and rotation rates, and $z_k$ may denote what may be observed, for example a GPS signal or a signal regarding the surroundings of vehicle 100 (camera, etc.).

Figure 7:
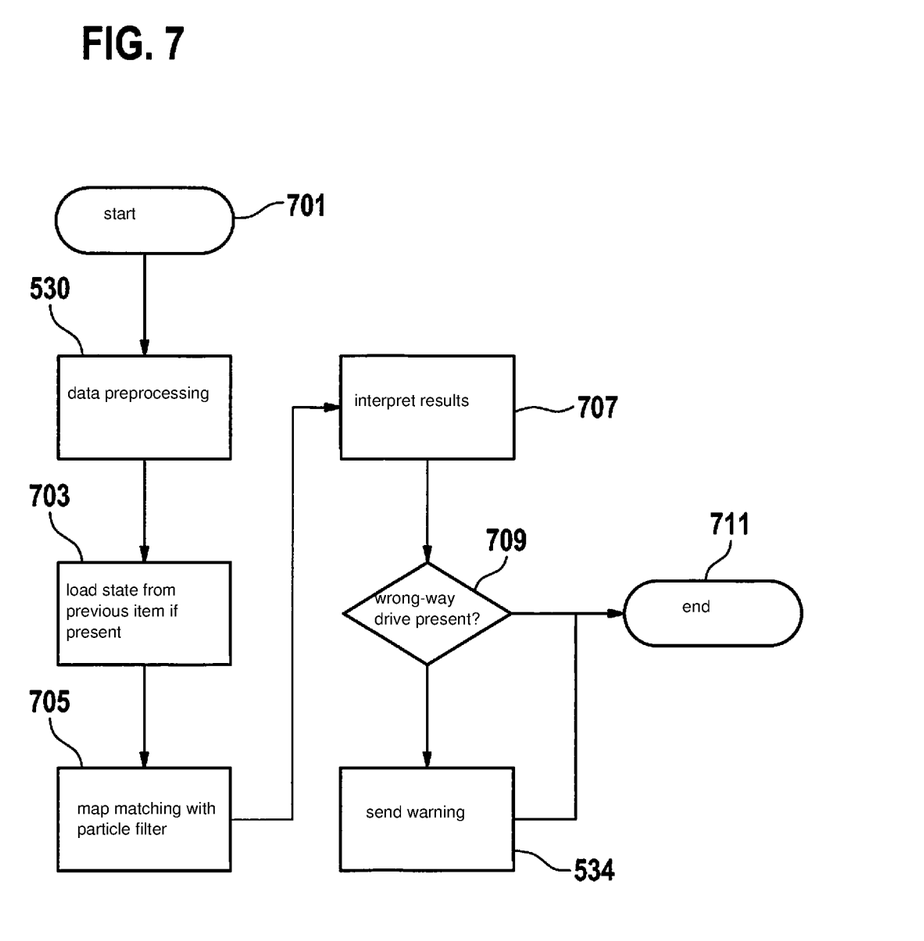
FIG. 7 shows a program sequence according to one exemplary embodiment.

FIG. 7 shows a program sequence according to one exemplary embodiment. The sequence starts with a block 701. In a block 530, a data preprocessing is carried out, as is described based on FIG. 5, for example. In a block 703, if present, the state from the previous item is loaded. In a block 705, a map matching with the particle filter takes place. In a block 707, an interpretation of the results takes place. In a block 709, it is checked whether a wrong-way drive is present. If this is the case, a warning is sent in a block 534, as is described based on FIG. 5, for example. If no wrong-way drive is present, the end of the program sequence takes place with a block 711.

Figure 8:
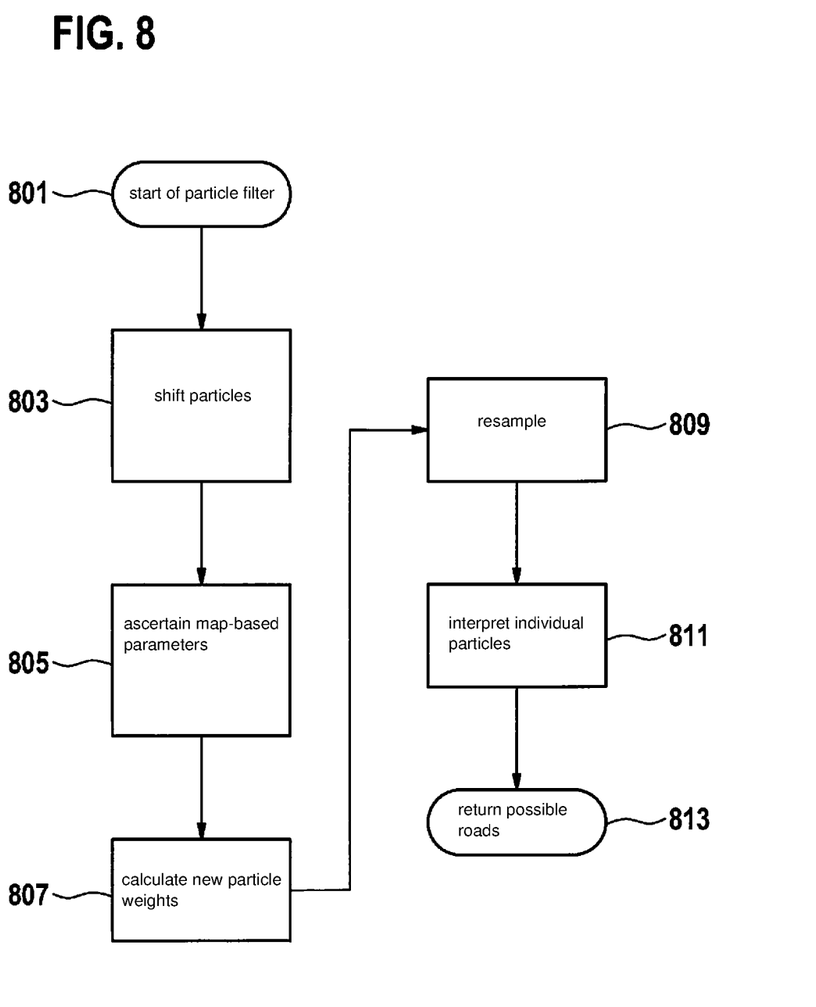
FIG. 8 shows a program sequence of a particle filter according to one exemplary embodiment.

FIG. 8 shows a program sequence of a particle filter according to one exemplary embodiment. A block 801 denotes a start of the particle filter. In a block 803, a shifting of the particles takes place, taking the sensor inaccuracy into consideration, for example of the sensor unit described based on FIG. 1. In a block 805, an ascertainment of the map-based parameters takes place. Such a parameter indicates, for example, whether a particle is situated on a road or what the name thereof is. In a block 807, a calculation of the new particle weights takes place. In a block 809, a so-called resampling takes place, in which the irrelevant areas and/or particles are eliminated. In a block 811, an interpretation of the individual particles takes place, and in a block 813, a return of the possible roads takes place.

By using the particle filter, the aspects described below are improved. On the one hand, a sequentially (possible in real time) operating method is created, which primarily ascertains the instantaneous position on the road network. Furthermore, a robust estimation of the instantaneous position on the road network is possible. An uncertainty is ascertainable via the instantaneous estimation. This makes it possible to be able to reliably delay the decision about a potential wrong-way drive, to a useful degree.

Figure 9:
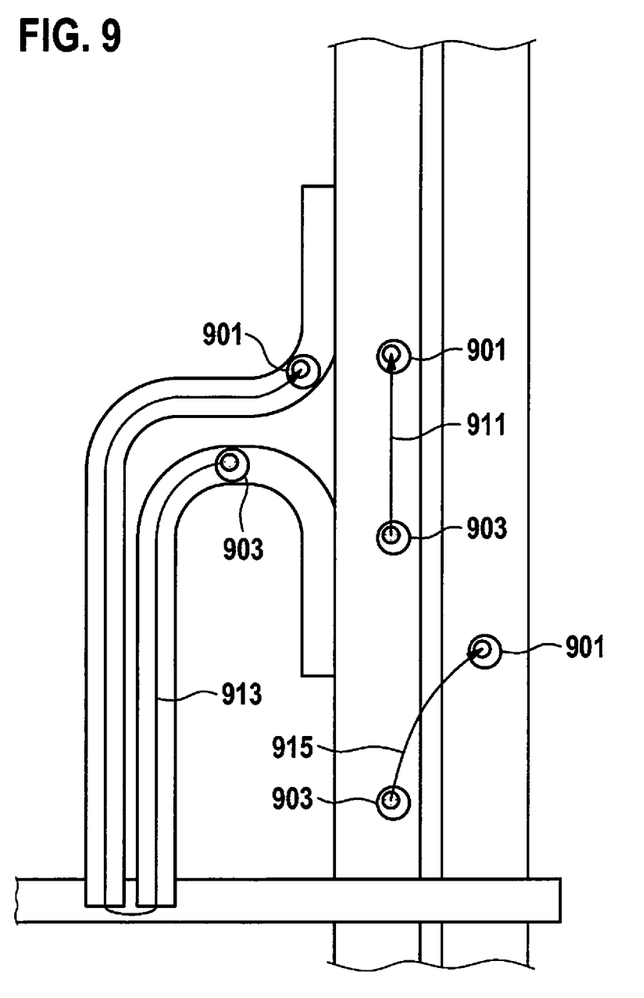
FIG. 9 shows an illustration of a consideration of a road topology according to one exemplary embodiment.

FIG. 9 shows an illustration of a consideration of a road topology in the method described here according to one exemplary embodiment.

The typical use of a particle filter differs to the effect that, in this application, the goal is not to achieve the best possible localization accuracy, but to ascertain, in all cases, the correct road elements. This means that, even if the sensor data indicate that a wrong-way drive is present, a warning should only be issued to the traffic at risk if there truly is certainty that a wrong-way drive in fact exists. An important component here is the consideration of the road topology.

The "observation model", i.e., the calculation of the particle probability, thus also depends on the covered path or the transition between two road elements. This could also be summarized as transition probability.

FIG. 9 shows a plurality of instantaneous particles 901, i.e., particles from an instantaneous calculation cycle (k), and a plurality of previously filtered particles 903, i.e., particles from a previous calculation cycle (k-1).

The following examples describe what must not happen and why it is important to consider the topology:

Green connection 911 shows a plausible particle movement.

Red connection 913 shows a non-plausible particle movement since the path covered (on the road network) would be much too large for this one time step.

Black connection 915 also shows a non-plausible particle movement since no connection of these roads is known in the known road section (distance is infinite).

Connections 911, 913, 915 may thus be understood as distances which may be considered in the filtering of particles 901, 903. For example, connections 911, 913, 915 may be used to adapt the weightings of particles 901, 903.

Figure 10:
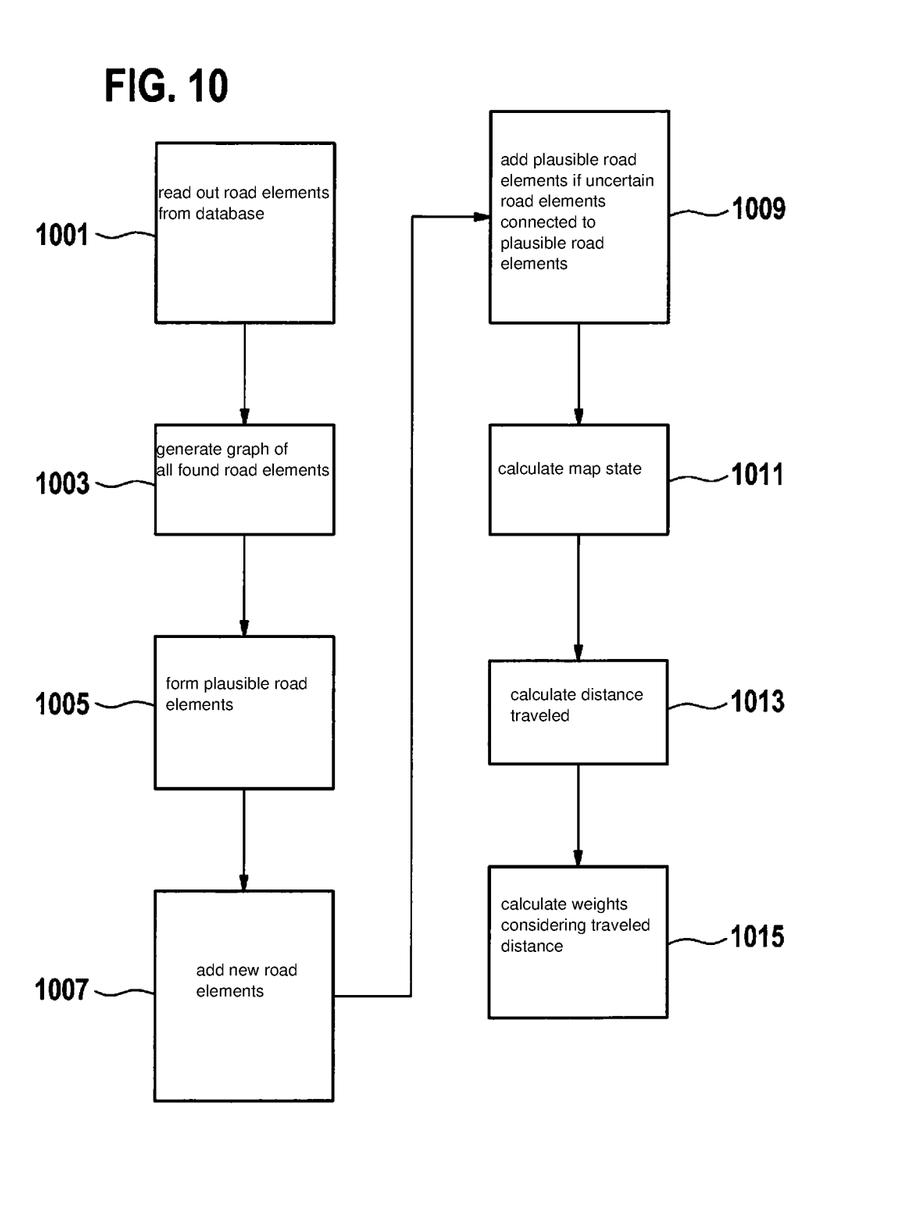
FIG. 10 shows a program sequence of a method for wrong-way driver detection according to one exemplary embodiment.

FIG. 10 shows a program sequence of a method for wrong-way driver detection according to one exemplary embodiment. For example, the method may be carried out using the device described based on FIG. 1.

Figure 11:
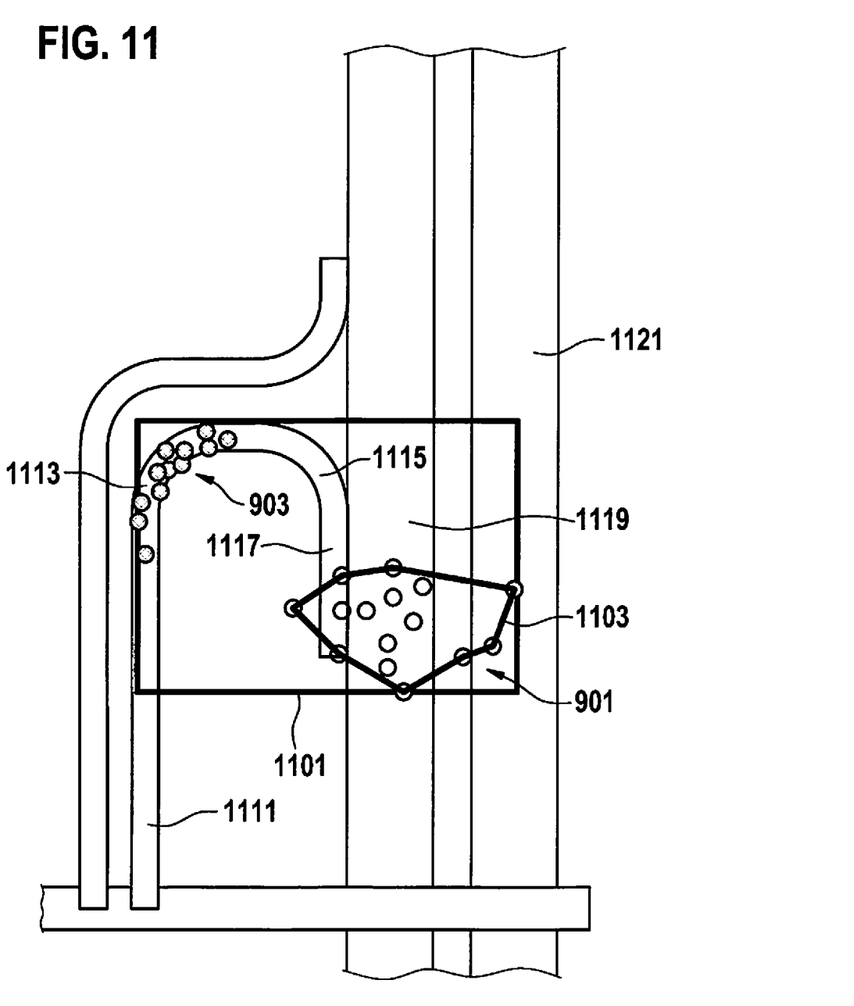
FIG. 11 shows an illustration of a consideration of a road topology according to one exemplary embodiment.

In a step 1001 of reading out, road elements, also referred to as road segments, are read out from a database. According to one exemplary embodiment, the reading out takes place with the aid of an envelope, in the form of a so-called bounding box, around particles from the last and this calculation step. A corresponding envelope is shown in FIG. 11. Referencing FIG. 11, road elements 1111, 1113, 1115, 1117, 1119, 1121 are selected.

In a step 1003, a graph including all found road elements is generated.

In a step 1005, all road elements from the previous step form plausible road elements.

In a step 1007, all "new" road elements are added to a list of uncertain road elements if these intersect with a polygon, a so-called convex hull of the instantaneous particles. A corresponding polygon is shown in FIG. 11. Referencing FIG. 11, road elements 1111, 1113, 1117, 1119 are selected as plausible road segments. Optionally, a further query is carried out whether the "old" road elements also intersect the convex hull. In this case, road elements 1117, 1119 are selected.

In a step 1009, plausible road elements are added if the uncertain road elements are connected to the plausible ones.

In a step 1011, a so-called "map state" is calculated.

In a step 1013, the distance traveled on the road network is calculated. For example, the connections shown based on FIG. 9 may be determined.

In a step 1015, the weights are calculated, additionally considering the traveled distance.

FIG. 11 shows an illustration of a consideration of a road topology according to one exemplary embodiment. This may be the topology shown based on FIG. 9.

Shown are a plurality of instantaneous particles 901, i.e., particles from an instantaneous calculation cycle (k), and a plurality of previously filtered particles 903, i.e., particles from a previous calculation cycle (k-1).

Furthermore, an envelope 1101 and a polygon 1103 are shown. Polygon 1103 is defined by instantaneous particles 901 situated the farthest on the outside. Envelope 1101 encloses both instantaneous particles 901 and previously filtered particles 903 and, according to this exemplary embodiment, is designed as a rectangle, which is defined by respective particles 901, 903 situated the farthest on the outside.

Furthermore, a first road segment 1111, a second road segment 1113, a third road segment 1115, a fourth road segment 1117, a fifth road segment 1119 and a sixth road segment 1121 are shown in FIG. 11, which are all intersected or enclosed by envelope 1101.

According to one exemplary embodiment, road segments 1111, 1113, 1115, 1117, 1119, 1121 are initially read in as a set of preceding plausible road segments in the method for wrong-way driver detection, using envelope 1101. Thereafter, road segments 1117, 1119, 1121, which are intersected by polygon 1103 spanned by instantaneous particles 901, will be determined as a set of uncertain road segments. Now, the set of preceding plausible road segments 1111, 1113, 1115, 1117, 1119, 1121 is supplemented with those of uncertain road segments 1117, 1119, 1121 which have a connection to one of the preceding plausible road segments 1111, 1113, 1115, 1117, 1119, 1121 to form the set of plausible road segments 1111, 1113, 1115, 1117, 1119, 1121.

For the expansion, the following adaptations result in the particle filter model:

Map state:

$$m_k^{[j]} = m_k = (n^{(m)} d^{(m)} \theta^{(m)} w^{(m)} t^{(m)})^T \text{ with } t^{(m)},$$

of the distance traveled on the road network

Observation model:

$$g(z_k, m_k | x_k, u_k) = \begin{cases} p(z_k|x_k)p(m_k|u_k), & \text{for } n^{(m)} > 1 \\ p(m_k|x_k)p(z_k|x_k)p(m_k|u_k), & \text{for } n^{(m)} = 1 \\ 0, & \text{otherwise} \end{cases}$$

with $p(m_k|u_k) = N_t^{(m)}(t_k^{(m)} - v_k^{(u)} T_k^{(u)})$ with $N_t^{(m)}(t) \sim N(0, (k_t(z)\sigma_t(u))^2)$ If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for wrong-way driver detection, the method comprising:
   reading in map data mapping road segments of a road network negotiable by a vehicle;
   determining a plurality of instantaneous particles using a measured instantaneous position of the vehicle, one particle representing an assumed position of the vehicle and a weighting assigned to the assumed position;
   reading in a plurality of previously filtered particles representing particles filtered in a preceding step of filtering using a particle filter;
   determining a set of plausible road segments, using the plurality of instantaneous particles and the plurality of previously filtered particles;
   filtering the plurality of instantaneous particles based on the set of plausible road segments, using the particle filter, to determine a plurality of filtered particles, and providing a wrong-way driving signal using the plurality of filtered particles, the wrong-way driving signal indicating whether or not a wrong-way drive of the vehicle is present.

2. The method as recited in claim 1, wherein, in the step of filtering the plurality of instantaneous particles, new weightings are determined for the plurality of instantaneous particles.

3. The method as recited in claim 1, further comprising: determining a traveled distance of the vehicle using the set of plausible road segments, wherein in the filtering step, the plurality of instantaneous particles are filtered based on the traveled distance.

4. The method as recited in claim 1, wherein, in the step of determining a set of plausible road segments, a set of preceding plausible road segments is read in, which represents a set of plausible road segments determined in a preceding step of determining, a set of uncertain road segments is determined, using the plurality of instantaneous particles, and the set of preceding plausible road segments is supplemented with those of the uncertain road segments which have a connection to one of the preceding plausible road segments to form a set of plausible road segments.

5. The method as recited in claim 1, further comprising: reading in the measured instantaneous position via an interface of a processor cloud.

6. A device for wrong-way driver detection including corresponding units, the device configured to:
read in map data mapping road segments of a road network negotiable by a vehicle;
determine a plurality of instantaneous particles using a measured instantaneous position of the vehicle, one particle representing an assumed position of the vehicle and a weighting assigned to the assumed position;
read in a plurality of previously filtered particles representing particles filtered in a preceding step of filtering using a particle filter;
determine a set of plausible road segments, using the plurality of instantaneous particles and the plurality of previously filtered particles;
filter the plurality of instantaneous particles based on the set of plausible road segments, using the particle filter, to determine a plurality of filtered particles, and
provide a wrong-way driving signal using the plurality of filtered particles, the wrong-way driving signal indicating whether or not a wrong-way drive of the vehicle is present.

7. A system for wrong-way driver detection, the system comprising:
at least one transmitter which is situatable or situated in a vehicle and configured to emit position data, the position data representing a measured position of a vehicle; and
a device for wrong-way driver detection, which is designed to receive the position data emitted by the at least one transmitter, the device configured to:
read in map data mapping road segments of a road network negotiable by a vehicle;
determine a plurality of instantaneous particles using a measured instantaneous position of the vehicle, one particle representing an assumed position of the vehicle and a weighting assigned to the assumed position;
read in a plurality of previously filtered particles representing particles filtered in a preceding step of filtering using a particle filter;
determine a set of plausible road segments, using the plurality of instantaneous particles and the plurality of previously filtered particles;
filter the plurality of instantaneous particles based on the set of plausible road segments, using the particle filter, to determine a plurality of filtered particles, and
providing a wrong-way driving signal using the plurality of filtered particles, the wrong-way driving signal indicating whether or not a wrong-way drive of the vehicle is present.

8. A non-transitory machine-readable memory medium on which is stored a computer program for wrong-way driver detection, the computer program, when executed by a computer, causing the computer to perform:
reading in map data mapping road segments of a road network negotiable by a vehicle;
determining a plurality of instantaneous particles using a measured instantaneous position of the vehicle, one particle representing an assumed position of the vehicle and a weighting assigned to the assumed position;
reading in a plurality of previously filtered particles representing particles filtered in a preceding step of filtering using a particle filter;
determining a set of plausible road segments, using the plurality of instantaneous particles and the plurality of previously filtered particles;
filtering the plurality of instantaneous particles based on the set of plausible road segments, using the particle filter, to determine a plurality of filtered particles, and
providing a wrong-way driving signal using the plurality of filtered particles, the wrong-way driving signal indicating whether or not a wrong-way drive of the vehicle is present.

* * * * *